United States Patent [19]
Laurenceau et al.

[11] Patent Number: 5,217,366
[45] Date of Patent: Jun. 8, 1993

[54] PROCESS FOR HEATING A THERMIC ENCLOSURE AND BURNER

[75] Inventors: Serge Laurenceau, Versailles; Olivier Charon, Les Ulis, both of France

[73] Assignee: L'air Liquide, Societe Anonyme pour l'Etude et l'Exploitation des Procedes Georges Claude, Paris, France

[21] Appl. No.: 772,497

[22] Filed: Oct. 7, 1991

[30] Foreign Application Priority Data

Oct. 16, 1990 [FR] France ................... 90 12737

[51] Int. Cl.⁵ .............................. F27D 7/00
[52] U.S. Cl. ........................... 432/13; 432/19; 432/20; 431/8; 431/159; 266/268
[58] Field of Search .............. 431/2, 8, 354, 159, 431/181, 187; 110/182.5, 182.6; 122/6.6, 6.7; 266/265, 268; 239/424, 557, 558; 432/161, 210, 19, 20, 22

[56] References Cited

U.S. PATENT DOCUMENTS

| | | | |
|---|---|---|---|
| 2,737,234 | 3/1956 | Reed | 239/559 |
| 4,226,588 | 10/1980 | Ohara | 432/161 |
| 4,396,182 | 8/1983 | Schaffar et al. | 266/265 |

FOREIGN PATENT DOCUMENTS

| | | | |
|---|---|---|---|
| 764890 | 9/1971 | Belgium . | |
| 0141101 | 11/1987 | European Pat. Off. . | |
| 0210314 | 12/1988 | European Pat. Off. . | |
| 2384590 | 7/1978 | France . | |
| 0083110 | 5/1983 | Japan | 239/424 |
| 0574475 | 9/1977 | U.S.S.R. | 266/268 |
| 1127908 | 12/1984 | U.S.S.R. | 266/265 |

Primary Examiner—Carl D. Price
Attorney, Agent, or Firm—Young & Thompson

[57] ABSTRACT

To heat a thermic enclosure, flames are generated in a burner having a plurality of injectors, from an oxy-combustible mixture, the flames extending in different directions and having different power and/or oxidizing reducing capacity. Application for example to the heating of furnaces or metallurgical ladles or glassware furnaces.

7 Claims, 1 Drawing Sheet

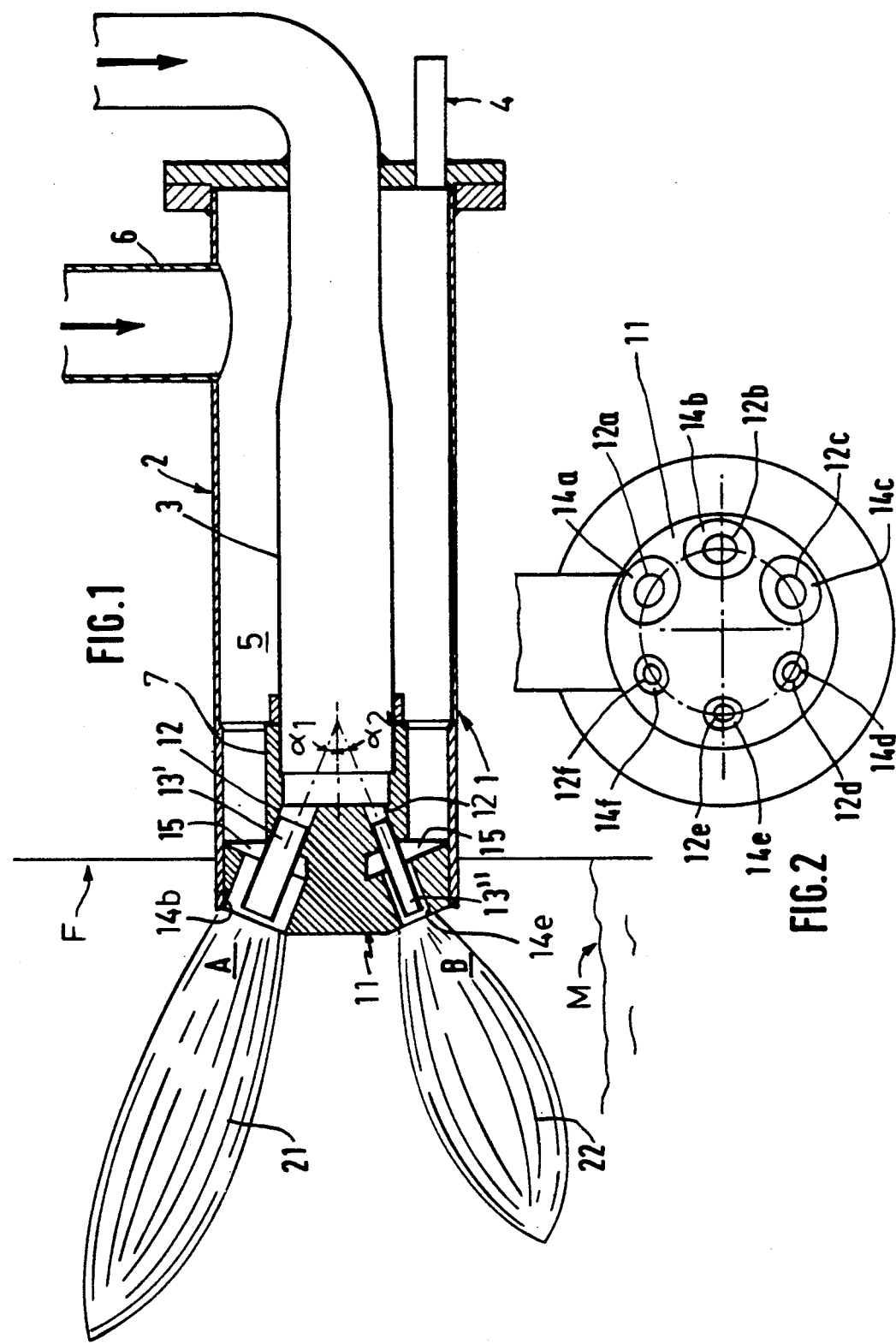

PROCESS FOR HEATING A THERMIC ENCLOSURE AND BURNER

BACKGROUND OF THE INVENTION (a) Field of the Invention

The present invention concerns processes for heating a thermic enclosure by means of at least one burner which produces at least two flames.

(b) Description of Prior Art

In the case of combustions which are produced from a combustible material and a fuel material consisting of air, it is easy to develop many forms of flames which are adapted to the designs of thermic enclosures in which different processes of heating are carried out. The mass flows which are used during combustions with air (about 1400 kg/MW) and the quantities of movement which may result therefrom enable to relatively easily shape the flames to give appropriate forms thereto, for example filiform or in the form of balls. When flames with high thermic performances are desired, the utilization of highly preheated air (between 1200° and 1400° C.) is necessary and the above mentioned ease of operation considerably decreases for technological reasons.

A very large number of combustion applications requiring high thermic performances imply the use of oxygen, as fuel material in specific industrial burners. The mass flows being different (about 300 kg/MW with oxygen), the burners utilizing pure oxygen as fuel material do not actually enable to control the problems of shaping of the flames and even less the zoning of the combustion products enabling to reduce the risks of oxidation of the materials under treatment.

On the other hand, with respect to the production of polluting materials, such as nitrogen oxides (NOx) the usual techniques of recirculation and shaping of the combustible and/or fuel material are not without disadvantage on the thermic processes. As a matter of fact, recirculation consists in producing zones close to the nose of the burner where the already already burnt gases are returned into the flame. The result is a decrease of the local concentrations of oxygen and a substantial decrease of the temperature of the flame which enable to minimize the quantities of nitrous oxides, the decrease of the flame temperature being on the other hand detrimental to the heat efficiency of the heating process. Also, the combustion in stages enables to carry out a combustion under sub-stoichiometric condition in a first zone close to the nose of the burner, the additional combustible or fuel material being brought in by means of a third injection which is later on mixed with the gas issued from the first combustion zone. This technique also promotes the minimization of the production of oxides of carbon but considerably modifies the thermic efficiency of the heating process.

SUMMARY OF INVENTION

It is an object of the present invention to propose a heating process with high thermic performances by combustion of oxy-combustible mixtures which is particularly simple to use, offers a great flexibility of utilization and enables to optimize the thermic yields of the heating process.

For this purpose, according to a characteristic of the invention, flames are generated in the burner, from oxy-combustible mixture, said flames extending in different directions and having different powers and/or different oxidizing/reducing capacities.

According to a more specific characteristic of the invention, at least one of the flames is supplied with higher flows of oxygen and combustible material than the flows fed to the other flame, typically one of the flames being supplied with an over-stoichiometric oxy-combustible mixture and the other flame with a sub-stoichiometric mixture.

In this manner, according to the invention, it is possible to generate substantial volumes of flame which are better adapted to the volume of the thermic enclosures and, more specifically, it is then possible to control the shape, the length and the orientation of the flames as well as their oxidizing or reducing capacity and to thereby optimize the thermic yields, and to produce flames which differ and which can be oriented towards different zones of the thermic enclosure and to produce reducing zones capable of promoting brisk combusting reactions of the charge in the thermic enclosure while observing acceptable thermic transfer properties.

In particular, due to the independent adaptation of the flows of oxygen and combustible material of each flame, it is possible to generate in the thermic enclosure combustion zones which differ, are reducing, neutral or oxidizing, as well as shapes of flames which differ, and which can be long or spreaded. On the other hand, the control of the stoichiometry, of the impulsion and the orientation of each flame enables to act on the quality of the mixture of fluids, for a given application, to minimize the production of polluting agents such as nitrogen oxides. Relatively low levels of nitrogen oxides, of the order of 80 to 100 ppm, could thus be obtained.

A burner for practicing the method of the invention can be of the type comprising at least two injectors communicating with inlet ducts of an oxy-combustible mixture, and is characterized in that the injectors are oriented in different directions and have different cross-sections.

BRIEF DESCRIPTION OF DRAWING

Other characteristics and advantages of the present invention will appear from the description which follows of an embodiment, given as an illustration but without limitation, with reference to the annexed drawing, in which:

FIG. 1 is a schematic view in axial cross-section of a burner installed in a metallurgical furnace enabling to carry out the process according to the invention;

FIG. 2 is a front view of the burner of FIG. 1.

DESCRIPTION OF PREFERRED EMBODIMENT

In the embodiment illustrated in the drawings, burner 1 includes a cylindrical sheath 2, for example having a diameter of 160 mm, and a co-axial central duct 3, for example for combustible material, such as propane or natural gas, peripherally defining, with sheath 2, an annular duct 5,, for example for industrial oxygen introduced into the annular duct 5 by means of a lateral inlet 6 extending through the sheath 2. A cell 4 for controlling the flame, via annular space 5 is provided at the rear of the burner. The cylindrical sheath 2 is typically surrounded by a water cooling jacket (not illustrated). At the front end of the sheath 2, there is provided an interchangeable burner nose 11 typically having a tubular central hub part 7 which is screwed at the front end of the central duct. The burner nose 11 has a plurality (six in the illustrated example) of angularly stepped orifices which are distributed around the axis of nose 11. Typically, each stepped orifice comprises an upstream part of reduced diameter 12 opening in the inner chamber of the central hub part 7 of the nose and a downstream part 14 of larger diameter. An injection nozzle 13 is mounted in the upstream bore 12 and extends to the downstream bore 14 to a distance near the downstream end of the latter thus forming an annular ejection chamber in the downstream part 14. Each downstream bore 14 communicates with the annular duct 5 by means of at least one transverse duct 15 formed in the nose 11 and radially opening outside the central hub part 7. Each stepped orifice 12, 14 typically forms with the axis of the nose 11 a divergin angle ($\alpha_i$) between 5° and 30°. It will be understood that by modifying the cross-sections of the bores 14 and injectors 13, flames which differ will be obtained, depending on the relative flows of oxygen and combustible material determined by these sections over and above global modulations in supplying the burner with oxygen and combustible material, since the capacity of the burner can be modified by simply changing nose 11.

According to another aspect of the invention, the injectors 13, 14 are angularly distributed around the axis of the burner into at least two groups of injectors of different cross-sections. In the illustrated example, the injectors are distributed into a group of three injectors ($14_a$ to $14_c$) of more important cross-section than another group of three injectors ($14_b$ to $14_f$), thus producing two types of flames, 21 and 22, respectively, the angles, ($\alpha_i$) of one group of injectors being for example different from angles ($\alpha_2$) of the other group of injectors.

Typically, in a furnace 7 for smelting metals, for example cast iron, the powerful flames (21) corresponding to the injectors of larger cross-section, are directed towards the vault of the furnace while the shorter flames (22), corresponding to the injectors of reduced cross-section, are less powerful, shorter and are oriented towards the metal charge M of the furnace. The powerful flames 21 are advantageously of oxidizing character (over-stoichiometric content of oxygen in the oxy-combustible mixture), while at least some of the short flames 22 directed towards the charge, advantageously have a reducing character (sub-stoichiometric content of oxygen in the oxy-combustible mixture). Typically, a sub-stoichiometric flame is associated with an over-stoichiometric flame, as adjacent pairs. In this type of application, the diverging angles $\alpha_i$ of the flames are generally between 10° and 25°, typically an angle of 15° for the short flames directed towards the charge and an angle of about 22° for the long flames directed towards the walls of the furnace. Under such conditions, the flames are formed independently of one another, each preserving its own shape and divergence with respect to the axis of the burner, their length varying from 1 meter to 2 meters for long flames depending on the power of the burner. The power of the burner may vary between 250 kW and 3 MW for oxygen flows between 100 and 600 $Nm^3$/hour and flows of natural gas between 50 and 300 $m^3$/hour.

The burner which has just been described is particularly suitable for heating processes in furnaces and metallurgical ladles, for example for smelting oxidizable materials, and because of the possibility of reducing the emissions of nitrogen oxides, in glassware, cement or enamelling furnaces.

Although the present invention has been described with reference to a particular embodiment, it is not limited thereto but on the contrary, it is capable of modification and variants which will appear to one skilled in the art. In particular, depending on utilizations, a channel for water cooling, possibly extending centrally of the nose burner 11 could easily be mounted in the central duct 3. As a variant, the nose burner 11 may also contain a central injector for the formation of a pilot flame at the center of the burner.

We claim:

1. A method of producing heat in a thermal enclosure by means of at least one burner having at one end at least a first and a second separate flame generating means discharging into the enclosure along two vertically angularly spaced directions, comprising the steps of:
   supplying to the first flame generating means a first flow of a first mixture of a fuel gas and of an oxygen-rich combusting gas;
   supplying to the second flame generating means a second flow of a second mixture of a fuel gas and of an oxygen-rich combusting gas;
   adjusting the first and second flows to form two differentiated flames having different geometric outlines;
   and adjusting the first and second mixtures so that they have different oxygen contents.

2. The method of claim 1, wherein the first mixture has an over-stoichiometric oxygen content.

3. The method of claim 2, wherein the second mixture has a sub-stoichiometric oxygen content.

4. The method of claim 3, for producing heat in a metal smelting furnace, wherein the second flame generating means is oriented toward a metal charge in the furnace.

5. The method of claim 4, wherein the second flow of the second mixture is adjusted to produce a short flame.

6. The method of claim 5, wherein the first flow of the first mixture is adjusted to produce a long flame having a length not less than 1 meter.

7. The method of claim 5, wherein the thermal power of the burner is adjustable between 250 kW and 3 MW.

* * * * *